US006832676B2

(12) United States Patent
Montanana (10) Patent No.: US 6,832,676 B2
(45) Date of Patent: Dec. 21, 2004

(54) ROTARY COUPLING (75) Inventor: Raul Montanana, Gloucestershire (GB)

(73) Assignee: SAMAR Systems Limited, Coleford (GB)

( * ) Notice: Subject to any disclaimer, the term of this patent is extended or adjusted under 35 U.S.C. 154(b) by 0 days.

(21) Appl. No.: 10/465,583

(22) Filed: Jun. 20, 2003

(65) Prior Publication Data
US 2004/0000461 A1 Jan. 1, 2004

(30) Foreign Application Priority Data
Jun. 26, 2002 (GB) .............................. 0214685

(51) Int. Cl.⁷ .............................................. F16D 59/00
(52) U.S. Cl. .................... 192/223.2; 192/223
(58) Field of Search ............... 192/223, 223.2, 192/14, 17 R, 12 R, 12 B (56) References Cited

U.S. PATENT DOCUMENTS

| | | | | |
|---|---|---|---|---|
| 1,858,066 A | * | 5/1932 | Verderber | 192/223.2 |
| 3,051,282 A | * | 8/1962 | Greene | 192/223 |
| 3,319,747 A | * | 5/1967 | Lauper | 192/223.2 |
| 4,706,791 A | | 11/1987 | Magliano | |
| 5,101,946 A | | 4/1992 | Lederman | |

FOREIGN PATENT DOCUMENTS

| | | |
|---|---|---|
| EP | 1 152 163 A2 | 11/2001 |
| GB | 1042013 | 9/1965 |
| GB | 2343923 | 5/2000 |
| JP | 6-313447 | 8/1994 |

* cited by examiner

Primary Examiner—Rodney H. Bonck
(74) Attorney, Agent, or Firm—Young & Thompson (57) ABSTRACT A rotary coupling comprises a driving part, a driven part, and a fixed part in which the driving and driven parts are rotatable coaxially. Coupling units are provided to be in torque-transmitting engagement with driving and driven parts. Coupling units are juxtaposed to an annular braking surface of the fixed part, and are free to move into and out of engagement with the braking surface. Each coupling unit includes a wedging surface and a bearing surface. A driving torque, applied by the driving part to the coupling units, is transmittable to the driven part without engagement of the coupling units with the braking surface. A reverse torque, applied by the driven part to the coupling units, first moves the bearing surface into non-wedging engagement with the braking surface and then progressively moves the wedging surface into progressive wedging engagement with the braking surface.

17 Claims, 7 Drawing Sheets

ROTARY COUPLING

BACKGROUND OF THE INVENTION

This invention relates to a rotary coupling.

The purpose of the invention is to provide a simple rotary coupling for use in applications where a reverse torque must not be transmitted to the driving side of the coupling. By a reverse torque it is meant a torque applied externally to the driven part of the coupling. In this regard, the actual direction of rotation, clockwise or anti-clockwise, is immaterial; the invention is concerned with rotary couplings which are not restricted as to the direction of rotation; rather, it provides a coupling in which torque is freely transmitted from the driving side to the driven side but not vice versa.

A rotary coupling, such as is known from GB 2343923, utilises coupling units carried by a driving part and seated in recesses on a driven part. As such, a driving torque can be transmitted from the driving part to the driven part through the coupling units, but the application of a reverse torque, i.e. where the driven part attempts to drive the driving part, such as in a runaway condition, causes the coupling units to move or tilt relative to their recesses, thereby engaging a fixed braking surface on the rotary coupling and locking it up.

A problem that occurs is that, on application of the reverse torque, the wedging engagement of the coupling units with the fixed braking surface tends to be instantaneous or nearly instantaneous. This can quickly lead to fatigue and damage of the components, particularly when the rotary coupling operates at high speed and/or is particularly large.

Furthermore, when the components of the coupling operate in a lubricating environment, as opposed to operating 'dry', the instantaneous or near instantaneous locking up of the coupling tends to remove the lubricant-film layer lining the fixed braking surface, leaving the surface exposed.

Another problem that becomes apparent is that of the stability of the coupling units in the direction parallel to the rotational axis of the rotary coupling. Since the coupling units can all move independently of each other, and since the recesses do not have to be particularly deep, the coupling units can become misaligned relative to each other.

The present invention seeks to overcome or mitigate these problems.

SUMMARY OF THE INVENTION

According to a first aspect of the present invention, there is provided a rotary coupling comprising a driving part and a driven part, for transmission of driving torque between them, a fixed part in which the driving and driven parts are each rotatable coaxially, and a set of coupling units carried by the driving part and seated in recesses in the driven part so as to be in torque-transmitting engagement therewith, the coupling units being juxtaposed to an annular braking surface of the fixed part, each coupling unit being free to move, with respect to the driving and driven parts, into and out of engagement with the braking surface and including a wedging part having a wedging surface and a bearing part having a bearing surface, the arrangement being such that a driving torque, applied by the driving part to the coupling units, is transmitted by the latter to the driven part without engagement of the coupling units with the braking surface; but a reverse torque, applied by the driven part to the coupling units, first moves the bearing surface of each coupling unit into non-wedging engagement with the braking surface and then moves the wedging surface into wedging engagement with the braking surface, the wedging engagement being progressive due to the bearing surface so as to progressively lock up the rotary coupling.

According to a second aspect of the present invention, there is provided a rotary coupling comprising a driving part and a driven part, for transmission of driving torque between them, a fixed part in which the driving and driven parts are each rotatable coaxially, and a set of coupling units carried by the driving part and seated in recesses in the driven part so as to be in torque-transmitting engagement therewith, each recess having a slot and each coupling unit being juxtaposed to an annular braking surface of the fixed part and having a skirt received in the slot to stabilise the coupling unit in a direction parallel to the rotational axis of the rotary coupling, each coupling unit being free to move, with respect to the driving and driven parts, into and out of engagement with the braking surface, and the arrangement being such that a driving torque, applied by the driving part to the coupling units, is transmitted by the latter to the driven part without engagement of the coupling units with the braking surface; but a reverse torque, applied by the driven part to the coupling units, progressively moves the coupling units into wedging engagement with the braking surface so as to progressively lock up the rotary coupling.

Preferably, the skirt is a close fit in the slot so that, when a reverse torque is applied to the rotary coupling, one or both sides of the slot frictionally engage the skirt to aid movement of the coupling unit into wedging engagement with the braking surface of the fixed part.

According to a third aspect of the present invention, there is provided a rotary coupling comprising a driving part and a driven part, for transmission of driving torque between them, a fixed part in which the driving and driven parts are each rotatable coaxially, and a set of coupling units carried by the driving part and seated in recesses in the driven part so as to be in torque-transmitting engagement therewith, the coupling units being juxtaposed to an annular braking surface of the fixed part, each coupling unit being free to move, with respect to the driving and driven parts, into and out of engagement with the braking surface and including a wedging part, having a wedging surface, and a pivot element which projects from the wedging surface into contact with the braking surface of the fixed part, the arrangement being such that a driving torque, applied by the driving part to the coupling units, is transmitted by the latter to the driven part without engagement of the coupling units with the braking surface; but a reverse torque, applied by the driven part to the coupling units, pivots each wedging part about its respective pivot element so that the coupling units progressively move into wedging engagement with the braking surface to progressively lock up the rotary coupling.

Preferably, the pivot element is a ball bearing spring biased towards the braking surface.

According to a fourth aspect of the present invention, there is provided a rotary coupling comprising a driving part and a driven part, for transmission of driving torque between them, a fixed part in which the driving and driven parts are each rotatable coaxially, and a set of coupling units carried by the driving part and seated in recesses in the driven part so as to be in torque-transmitting engagement therewith, the coupling units being juxtaposed to an annular braking surface of the fixed part and being free to move, with respect to the driving and driven parts, into and out of engagement with the braking surface, each coupling unit including an opening and the driven part including a corresponding pin element which is received in the said opening, the arrangement being such that a driving torque, applied by the driving part to the coupling units, is transmitted by the latter to the driven part without engagement of the coupling units with the braking surface; but a reverse torque, applied by the driven part to the coupling units, moves each coupling unit into wedging engagement with the braking surface, the wedging engagement being progressive due to the pin element aiding the movement of the coupling unit to progressively lock up the rotary coupling.

Preferably, the coupling units of the first to fourth aspects of the invention are free to move independently of each other.

The present invention will now be described, by way of example only, with reference to the accompanying drawings.

DETAILED DESCRIPTION OF THE PREFERRED EMBODIMENTS

Figure 1:
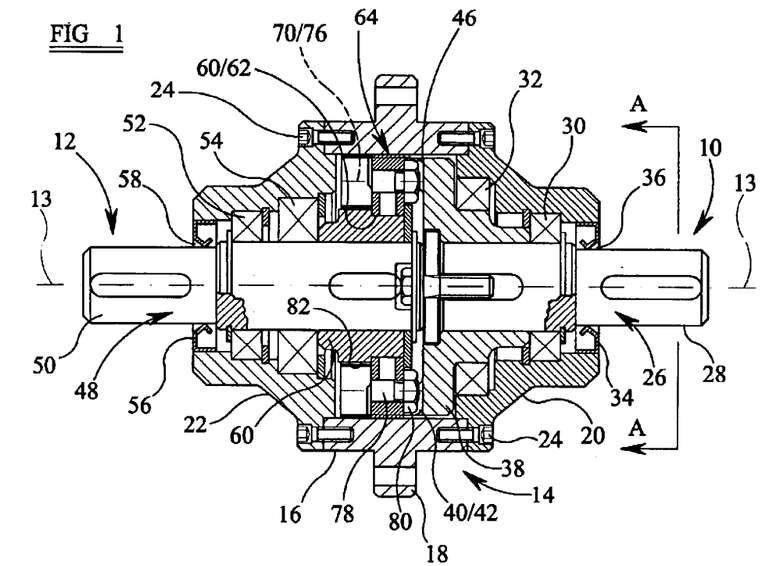
FIG. 1 is a partial longitudinal cross-section of a first embodiment of a rotary coupling, in accordance with the first aspect of the invention.
Figure 2:
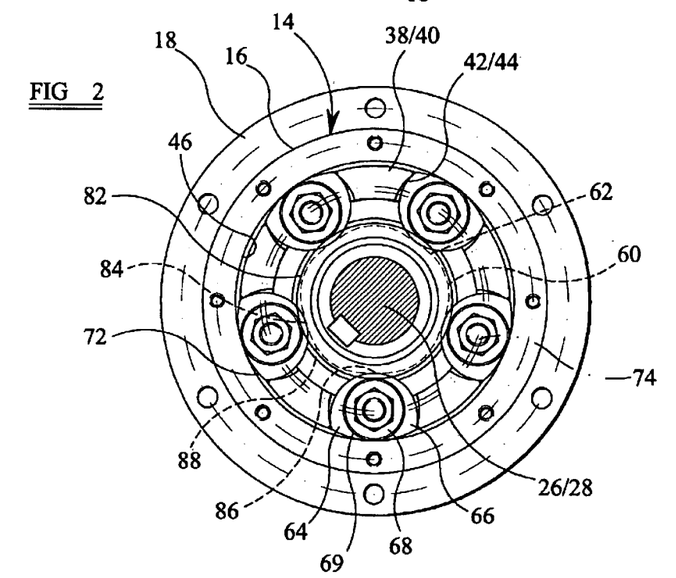
FIG. 2 is a schematic end view along the line A—A of the rotary coupling shown in FIG. 1.

Referring firstly to FIGS. 1 and 2 of the drawings, a first embodiment of the rotary coupling comprises a driving part 10 and a driven part 12, for continuous transmission, in normal operation, of a driving torque from the driving part to the driven part. The coupling also has a fixed part 14 in which the driving and driven parts 10 and 12 are each rotatable coaxially on a main rotational axis 13 of the rotary coupling.

The fixed part 14 in this example comprises an open-ended cylindrical body 16 having a fastening flange 18 by which the rotary coupling is secured to a vehicle or other suitable appliance. One end of the body 16 is closed by an end housing 20 and the other by an end housing 22. The body 16 and its two end housings 20 and 22 are secured together by suitable fastening means, such as by screw-threaded fasteners 24.

The driving part 10 of the coupling comprises a driving shaft, or input shaft, 26 having a projecting portion 28 which is coupled to the power drive, not shown, of the vehicle or appliance. The driving shaft 26 extends through the end housing 20 and coaxially with the cylindrical body 16 of the fixed part 14. The end housing 20 includes bearings 30 and 32 positioned in spaced apart relationship therein, and a gasket 34 situated adjacent the opening 36 of the end housing 20. The driving shaft 26 is directly supported by the bearing 30 and projects through the gasket 34, which provides a fluid-tight seal around the circumference of the driving shaft 26.

The driving part 10 is completed by a planet carrier 38, which is keyed on the driving shaft 26. The planet carrier 38 is supported by the bearing 32.

The planet carrier 38 includes a coaxial, integral, annular ring 40 which is interrupted by a number of U-shaped (when viewed in plan) seatings 42, each having two generally opposed arcuate thrust surfaces 44. As shown in FIG. 2, the outer perimeter of the ring 40 lies just radially inside the axial bore of the body 16, which constitutes a braking surface 46 as will be seen below.

The driven part 12 comprises a driven shaft, or output shaft, 48 having a projecting portion 50. The driven shaft 48 extends through the end housing 22 and coaxially with the cylindrical body 16 of the fixed part 14 and the driving shaft 26 of the driving part 10. The end housing 22, similarly to the end housing 20, includes bearings 52 and 54 positioned in spaced apart relationship therein, and a gasket 56 situated adjacent the opening 58 of the end housing 22. The driven shaft 48 is directly supported by both bearings 52 and 54 and projects through the gasket 56, which provides a fluid-tight seal around the circumference of the driven shaft 48.

The ring 40 of the planet carrier 38 surrounds a radial flange 60 which is an integral part of the driven shaft 48. The radial flange 60 is formed with curved or concave recesses 62 which are open towards the corresponding seatings 42.

The driving part 10 and the driven part 12 of the coupling are thus both rotatable coaxially within the fixed part 14.

The driving and driven parts 10 and 12 are coupled together by means of a set of independent coupling units 64. These are arranged in a planetary array around the output shaft 48. Each coupling unit 64 includes a wedging part, in the form of a wedging element 66, and a bearing part in the form of a roller bearing 68 having a bearing surface 69.

The major part of the wedging element 66 is cylindrical with a cylinder axis 70 parallel to the rotational axis 13 of the rotary coupling. However, in each coupling unit 64, this cylinder is truncated parallel to its cylinder axis 70, as can clearly be seen in FIG. 2, to define a wedging surface 72 facing radially outwards towards the braking surface 46. Each wedging surface 72 is of arcuate cross section, with a slightly smaller radius than the braking surface 46.

It will be noted that the cylinder axis 70 of each wedging element 66 lies on a pitch circle 74 which is intermediate the inner and outer perimeters of the ring 40.

The roller bearing 68 is circular and has a rotational axis 76 which is coaxial with the cylinder axis 70 of the wedging element 66. The wedging element 66 and the roller bearing 68 are fastened together by a fastening device, typically in the form of a threaded bolt 78 and nut 80.

The roller bearing 68 can move or rotate independently of the wedging element 66 and, when the wedging element 66 is seated symmetrically or substantially symmetrically in the respective recess 62, can run on a cylindrical portion 82 of the radial flange 60.

The roller bearing 68 is dimensioned so that the radius of the bearing surface 69 is greater than the shortest straightline distance between the cylinder axis 70 of the wedging element 66 and its wedging surface 72.

In normal operation, when a torque is being transmitted from the driving part 10 to the driven part 12, this torque is transmitted to the wedging elements 66 by the ring 40, through the appropriate thrust surfaces 44 (depending on the direction of rotation), in the form of a generally tangential thrust in a radial zone (generally defined by the surface 44), so that this thrust is close to, and/or passes through, the cylinder axis 70 of each wedging element 66. The thrust surfaces 44 may be shaped, as can be seen in FIG. 2, to lie at an angle to the wedging elements 66. This enables point contact between the thrust surfaces 44 and the respective wedging elements 66. This point contact allows the orientation of the thrust imparted by the thrust surfaces 44 to the wedging elements 66 to be controlled and thus improve the performance of the rotary coupling.

The wedging elements 66 project radially inwards from the ring 40 to engage, in another radial zone, in the recesses 62 of the radial flange 60, thereby transmitting the torque to the driven part 12. Referring to FIG. 2, the base portion 84 of each recess 62 is arcuately formed with a radius that matches that of the bottom surface 86 of each wedging element 66. The surface portions 88 of the recess 62 adjacent the base portion 84 present cam forms so that, when taken in cross-section, the profile of each recess 62 is part-sinusoidal and acts to retain the coupling.

In a normal stationary configuration, each wedging element 66 lies in a generally radially symmetrical attitude in its seating 42, and the wedging surfaces 72 of the wedging elements 66 and the bearing surfaces 69 of the roller bearings 68 are out of contact with the braking surface 46 of the fixed part 14.

If a net reverse torque is applied (for example, in a runaway condition) externally to the driven part 12 of the rotary coupling, this reverse torque is transmitted to the coupling units 64 through the recesses 62. The radial engagement zone of the coupling units 64 with the driven part 12 is substantially further from the cylinder axis 70 than the radial zone in which the forward thrust is applied by the thrust surfaces 44 in the normal driving mode. A turning moment is therefore applied to the wedging elements 66 by the recesses 62 as the wedging elements 66 move along the base portion 84 and the cam-form surface portions 86. This induces movement about the cylinder/roller bearing axes 70/76, which are therefore moment axes, and causes the wedging elements 66 to ride up one or other thrust surface 44 (depending on the direction of rotation of the coupling) towards the braking surface 46.

The movement of the wedging elements 66 causes the associated roller bearings 68 to also move towards the braking surface 46. Since in the normal stationary configuration the roller bearing 68 stands proud of the wedging surface 72 of the associated wedging element 66, even after some rotational movement of the wedging element 66, the bearing surface 69 of the roller bearing 68 contacts the braking surface 46 in non-wedging engagement before the wedging surface 72 of the wedging element 66. This prevents the wedging element 66 from suddenly 'biting' into wedging engagement with the braking surface 46.

As each wedging element 66 continues to rotate and ride up one cam-form surface portion 88 of its recess 62, the wedging surface 72 progressively comes into contact, and is thus forced into progressive wedging engagement, with the braking surface 46. This has the effect of progressively locking up the rotary coupling and, once locked up, preventing the reverse torque from passing to the driving part 10.

Figure 3:
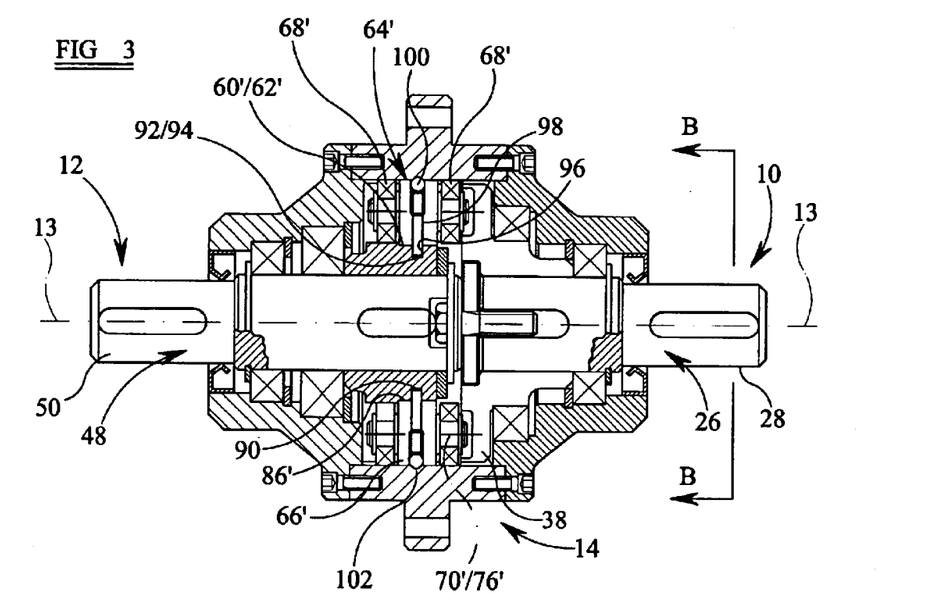
FIG. 3 is a partial longitudinal cross-section of a second embodiment of a rotary coupling, in accordance with the first, second and third aspects of the invention.
Figure 4:
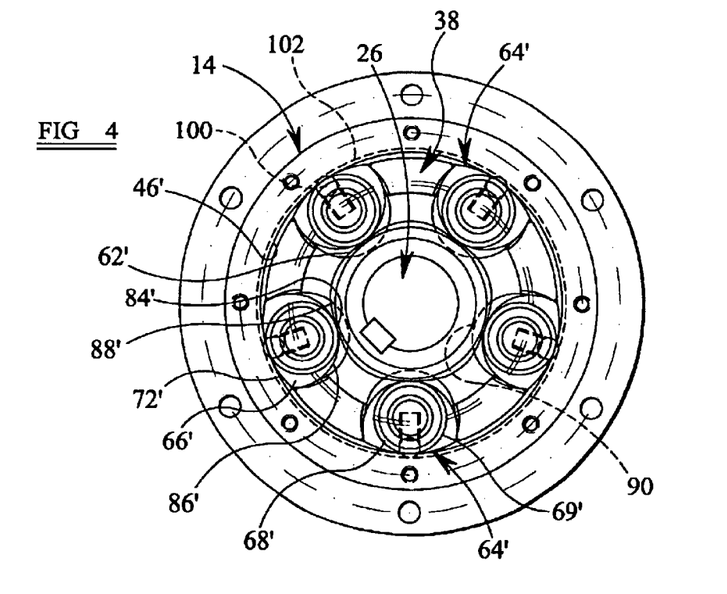
FIG. 4 is a schematic end view along the line B—B of the rotary coupling shown in FIG. 3.

Referring now to FIGS. 3 and 4 of the drawings, the second embodiment of the rotary coupling of the present invention is shown therein. The second embodiment relates, in the main, to the coupling units, and as such the parts similar to those of the first embodiment have the same reference numerals and detailed description is omitted.

The bearing part of the coupling unit 64' of the second embodiment includes two roller bearings 68' having respective bearing surfaces 69'. The roller bearings 68' sandwich the wedging element 66' therebetween so that the centre of mass of the coupling unit 64' coincides or substantially coincides with the centre of mass of the wedging element 66'.

The roller bearings 68' and wedging element 66' are fastened together by a fastening device in a similar fashion as the first embodiment. The roller bearings 68' function in an identical manner to the roller bearing 68 of the first embodiment.

The provision of a roller bearing 68' on opposite sides of the wedging element 66' helps to stabilise and balance the coupling unit 64', preventing undesirable tilting or movement of the cylinder axis 70' and roller bearing axes 76'.

Each coupling unit 64' includes an arcuate elongate skirt 90. The skirt 90 extends centrally from the bottom surface 86' of the wedging element 66', transversely to the cylinder axis 70' and at a position which is diametrically opposite the wedging surface 72'.

Each recess 62' of the radial flange 60' includes an elongate slot 92 formed in the base portion 84' in a direction transverse to the rotational axis 13. The slot 92 is dimensioned so that the skirt 90 can fit therein without contacting the bottom surface 94 of the slot 92. The skirt 90, in conjunction with the slot 92, acts to further stabilise the coupling unit 64' in a direction parallel to the rotational axis 13 of the rotary coupling.

The skirt 90 is a close fit in the slot 92 so that one or both sides 96 of the slot 92 can frictionally engage the side(s) 98 of the skirt 90.

A pivot element 100 also projects from the wedging surface 72' of the coupling unit 64'. In order to ensure that the centre of mass of the wedging element 66' coincides with the centre of mass of the coupling unit 64' as a whole, the pivot element 100 is positioned at or substantially at the centre point of the wedging surface 72'.

The pivot element 100 is typically a ball bearing which is spring biased radially outwards from the rotational axis 13 to continuously or substantially continuously contact the braking surface 46'.

The braking surface 46', as shown in FIGS. 3 and 4, may be formed with an annular groove 102 in which the pivot element 100 can run. The annular groove 102, in conjunction with the pivot element 100, acts to stabilise the coupling unit 64' against movement in a direction parallel to the rotational axis 13 of the rotary coupling.

On application of a net reverse torque, the coupling units 64' move in a similar fashion as described with reference to the first embodiment. However, in addition, the wedging element 66' tends to pivot about the pivot element 100 as the coupling unit 64' rotates. The pivot element 100, and in particular the spring biasing of the pivot element 100, encourages more progressive rotation of the wedging element 66', which results in a more positive and progressive movement of the wedging surface 72' into wedging engagement with the braking surface 46'.

The engagement between the side(s) 96 of the slot 92 in the recess 62' and the side(s) 98 of the skirt 90 aids movement of the wedging element 66' along the base portion 84' and up the cam-form surface portions 88' of the recess 62'. The engagement also prevents or inhibits the wedging element 66' from moving out of contact with the surface of the recess 62'.

FIGS. 6 to 9 show a third embodiment of the rotary coupling of the present invention. The third embodiment relates, in the main, to the coupling units, and as such the parts similar to those of the first and second embodiments have the same reference numerals and detailed description is omitted.

The rotary coupling of the third embodiment is a heavy-duty coupling intended for use, for example, as part of a lock gate mechanism. As such, the coupling runs in a 'dry' state, that is, without the need for the coupling to be fluid-tightly sealable and containing a lubricating liquid in which the components can run. Friction braking material 105 is included on the wedging surface 72" of the wedging elements 66", but may alternatively or additionally be incorporated on the braking surface 46".

Figure 6:
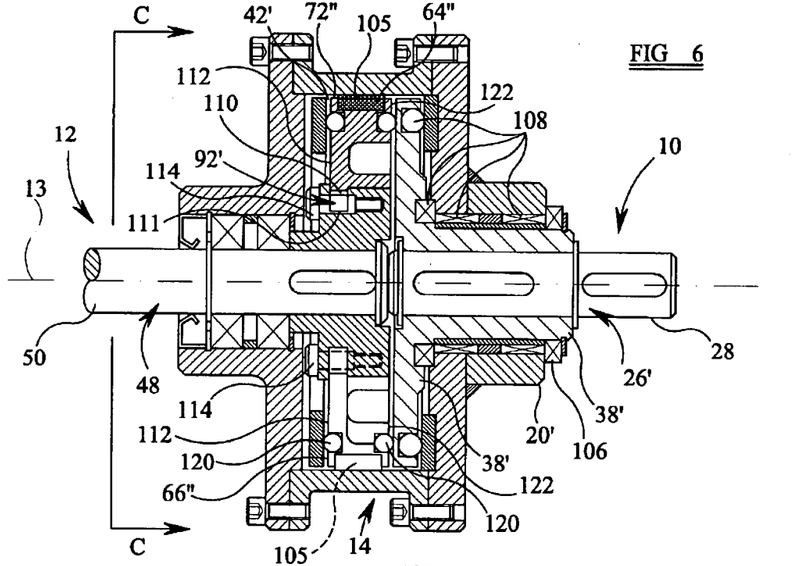
FIG. 6 is a partial longitudinal cross-section of a third embodiment of a rotary coupling, in accordance with the second aspect of the invention.

Furthermore, due to the intended heavy-duty use of this rotary coupling, the planet carrier 38' extends along the driving shaft 26' and projects through the end housing 20'. The planet carrier 38' and the associated end housing 20' are axially fixed or substantially fixed relative to each other by a split ring and bearing arrangement 106. Bearings 108 also support the longitudinal extent and the radial extent of the planet carrier 38'.

Figure 5:
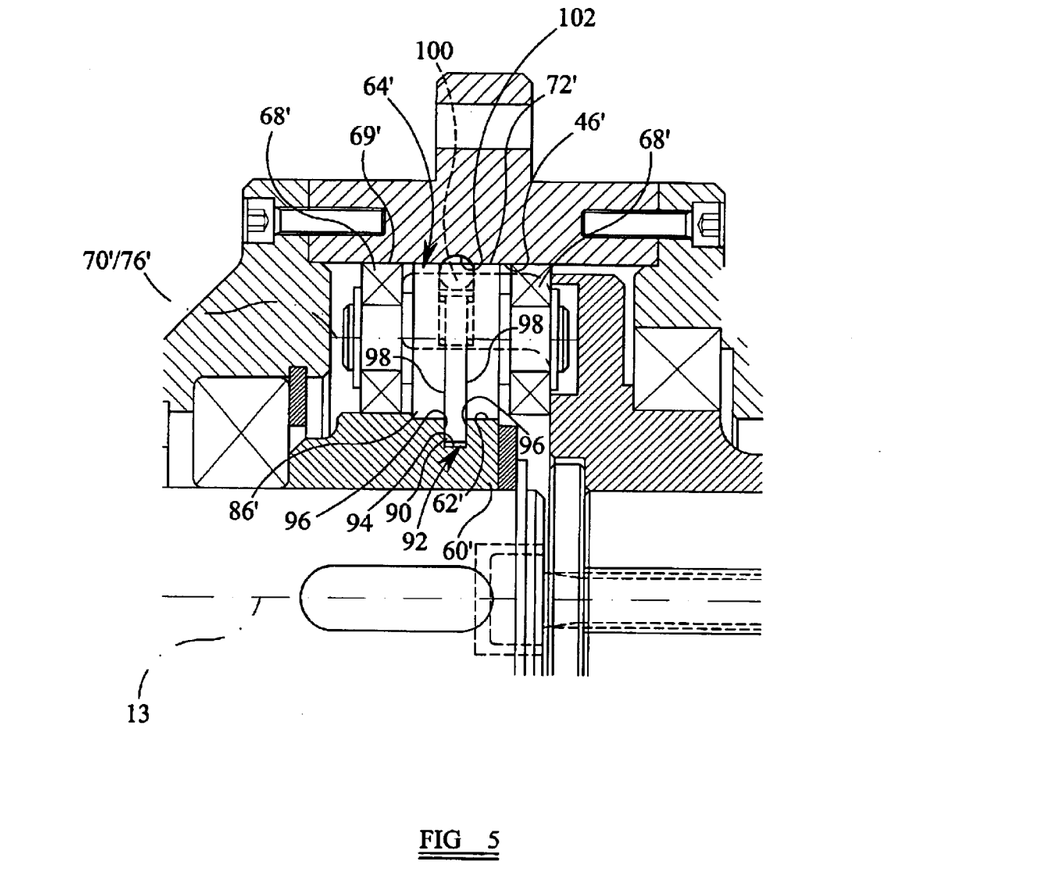
FIG. 5 is an enlarged view of part of the rotary coupling shown in FIG. 3.

The coupling units 64" include an arcuate elongate skirt 90', similar to the coupling units 64' of the second embodiment, which has an opening 110 formed symmetrically therein. The opening 110 may be a recess in the bottom surface 111 of the skirt 90', as shown in FIGS. 5 and 6, but may equally be an aperture or through-hole.

In this embodiment, the skirt 90' is offset in a direction parallel to the rotational axis 13 towards the driven part 12, in line with the side surface 112 of the wedging element 66", and the bearing part of the coupling unit 64" is omitted. However, the skirt 90' could be centrally formed, as in the second embodiment, and the bearing part may be provided as in the first or second embodiments.

Figure 8:
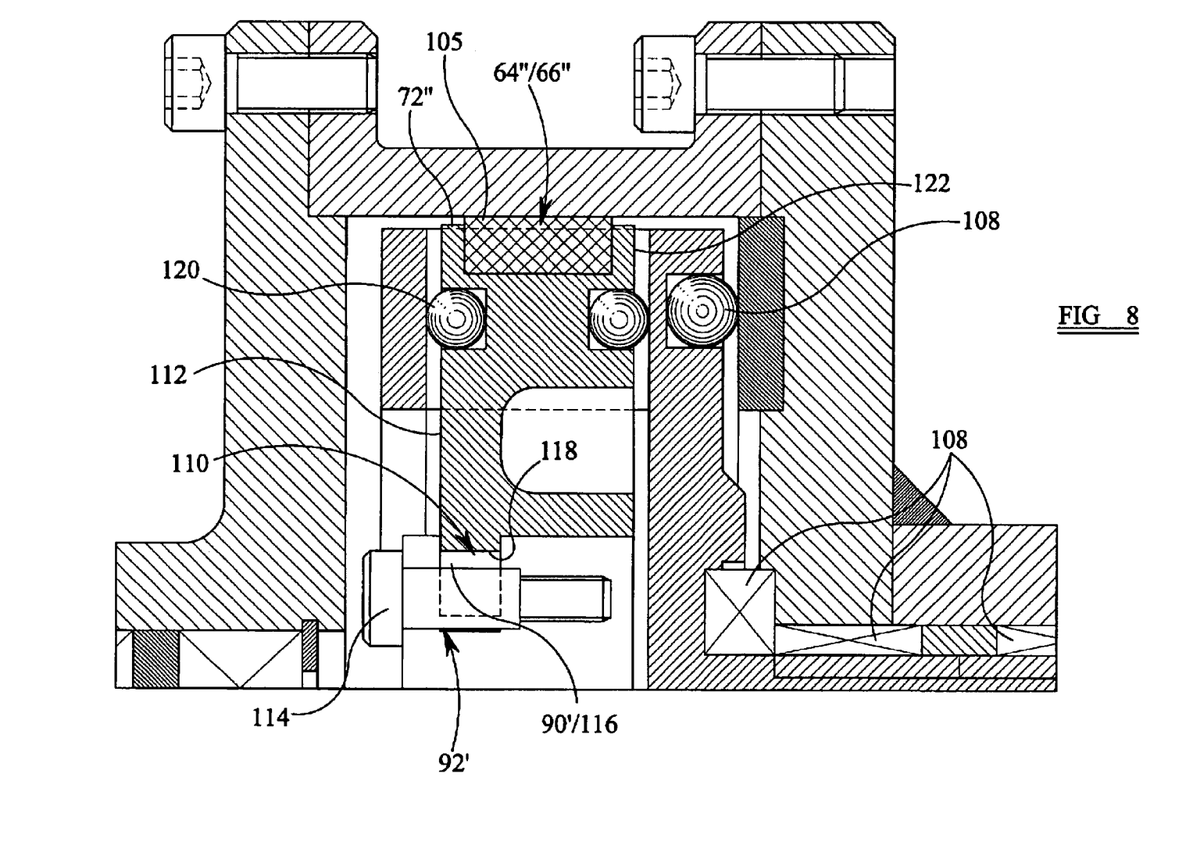
FIG. 8 is an enlarged view of part of the rotary coupling shown in FIG. 6.
Figure 9:
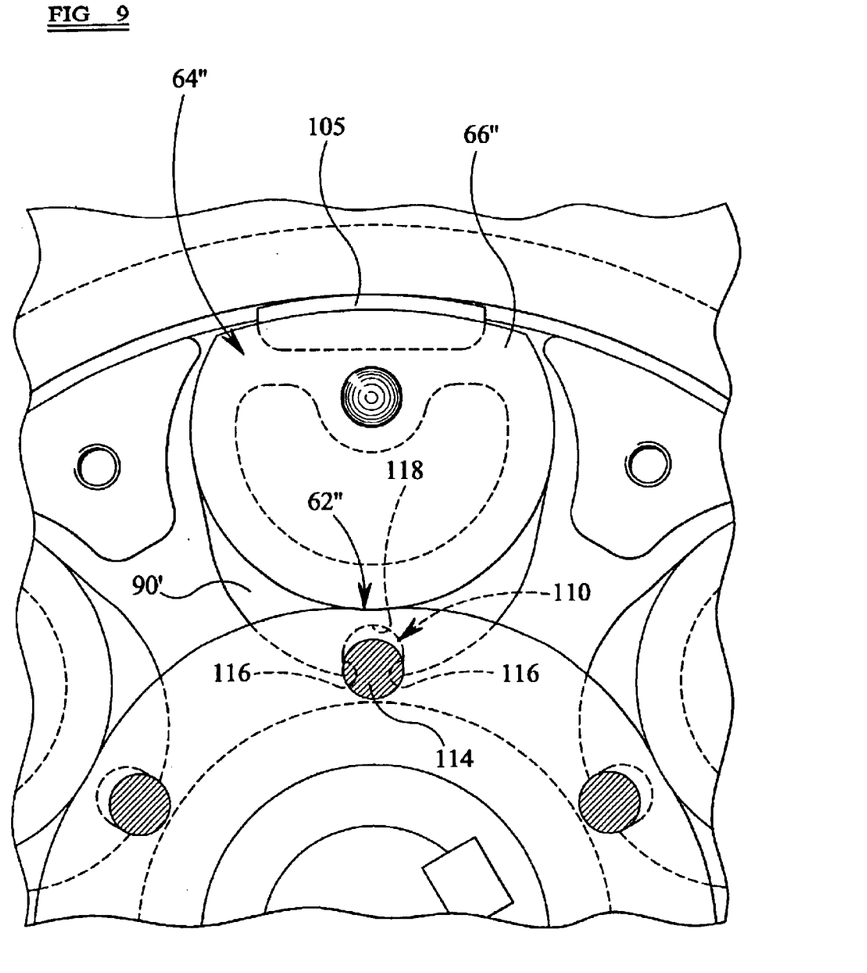
FIG. 9 is an enlarged view of part of the rotary coupling shown in FIG. 7.

Each recess 62" of the radial flange 60" includes an elongate slot 92', similarly to the second embodiment, in which the skirt 90' of the corresponding coupling unit 64" is received. Each slot 92' includes a pin element 114, the longitudinal extent of which extends across the slot 92' in parallel or substantially in parallel with the rotational axis 13 of the rotary coupling. The pin element 114 is received as a close fit between the side portions 116 of the opening 110 of the skirt 90', but is spaced from the bottom portion 118 of the opening 110.

Figure 7:
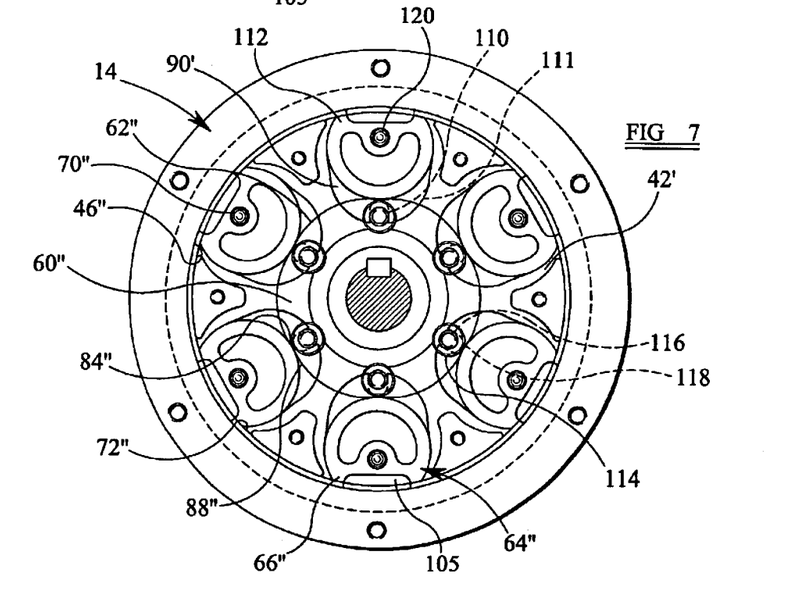
FIG. 7 is a schematic end view along the line C—C of the rotary coupling shown in FIG. 6.

Since the roller bearings 68/68' are omitted, the seatings 42' of the planet carrier 38' are closed seatings, as opposed to the U-shaped seatings 42 of the first and second embodiments. The coupling units 64" also include two ball bearings 120, each located on opposite side surfaces 112 and 122 of each wedging element 66", along or substantially along the cylinder axis 70".

The pin element 114, acting in conjunction with the corresponding opening 110 in the associated skirt 90', helps to retain the coupling unit 64" in a symmetrical or substantially symmetrical attitude in the recess 62" during normal operation of the rotary coupling, and, on application of a net reverse torque, aids in providing a positive and progressive movement and rotation of the wedging element 66" along the base portion 84" and cam-form surface portions 88" of the recess 62". This again promotes progressive wedging engagement of the wedging surfaces 72" with the braking surface 46", whereby the rotary coupling is progressively locked up rather than being instantaneously or substantially instantaneously locked up.

Although the rotary coupling of the third embodiment is intended to run 'dry', it may of course be fluid-tightly sealable and have a lubricating liquid, such as oil or an oil-based liquid, contained therein. Suitable friction braking material may also be incorporated in such a lubricated system on the wedging surfaces 72" of the wedging elements 66" and/or on the braking surface 46".

The rotary couplings of the first and second embodiments may also run 'dry' or in lubricating liquid. Suitable friction braking material may also be located on the wedging surfaces 72/72' and/or on the braking surface 46/46'.

Figure 10:
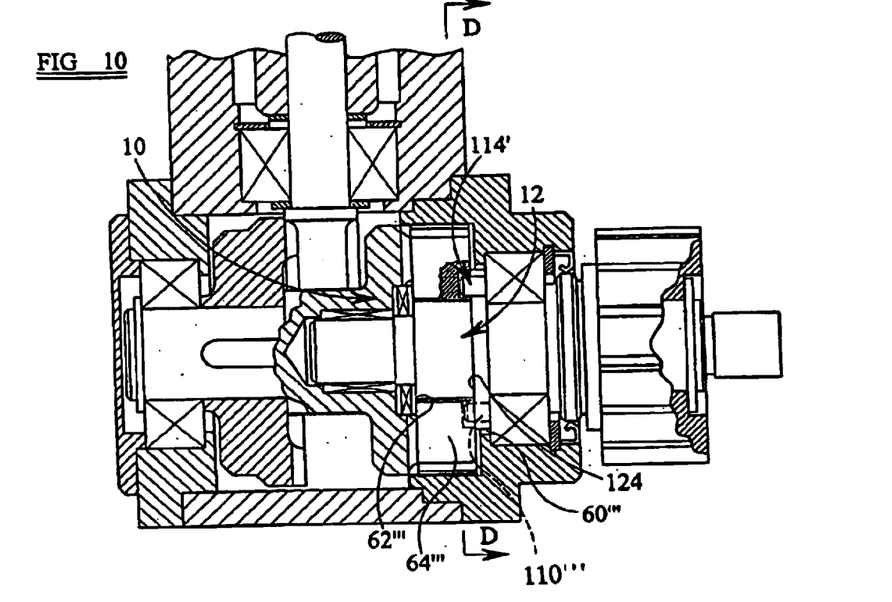
FIG. 10 is a partial longitudinal cross-section of a fourth embodiment of a rotary coupling, in accordance with the fourth aspect of the invention.
Figure 11:
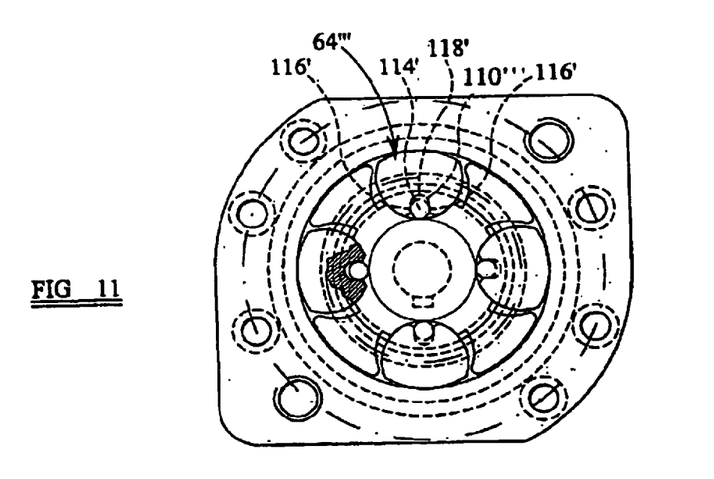
FIG. 11 is a schematic end view along the line D—D of the rotary coupling shown in FIG. 10.

FIGS. 10 and 11 show a modification to the third embodiment of the rotary coupling. This fourth embodiment relates, in the main, to the coupling units and the corresponding pin elements, and as such the parts similar to those of the first, second and third embodiments have the same reference numerals and detailed description is omitted.

In this embodiment, the skirt 90' and the slot 92' are dispensed with. Opening 110' is instead formed in one side of the coupling unit 64''', and pin element 114' projects from one end surface 124 of the flange 60''' of the driven part 12 adjacent to the recess 62'''. As in the third embodiment, the opening 110''' is dimensioned so that the pin element 114" is received as a close fit between the side portions 116" of the opening 110", but is spaced from the bottom portion 118" of the opening 110".

This modification allows the size and the manufacturing cost of the rotary coupling to be further reduced while retaining the advantages of the pin element as described in the third embodiment.

As with the third embodiment, opening 110''' could be a through-hole, or recess that extends across the bottom surface of the coupling unit, instead of a blind recess as shown in FIG. 10.

Although the embodiments have been described as having various components, it will be understood that the combination of components used may be varied. For example, it is envisaged that the coupling units could comprise the two roller bearings, pivot element and skirt with opening and that the slot of the recess could include the pin element.

However, in an alternative arrangement, the rotary coupling may have coupling units which only comprise a wedging part having a pivot element.

Other alternative arrangements will also be obvious. For example, the single roller of the first embodiment could be combined with the opening in the coupling unit and the pin element of the fourth embodiment.

It is thus possible to provide a rotary coupling which, on application of a net reverse torque, is progressively locked up. Furthermore, it is possible to improve the stability and balance of the coupling units. It is also possible to prevent or inhibit movement of the coupling unit away from the recess during the locking up of the rotary coupling.

The embodiments described above are given by way of example only and various modifications will be apparent to persons skilled in the art without departing from the scope of the present invention as defined by the appended claims. For example, the bearing part could have a fixed bearing surface; and the wedging part could be in the form of a ball or roller.

What is claimed is:

1. A rotary coupling comprising a driving part and a driven part, for transmission of driving torque between them, a fixed part in which the driving and driven parts are each rotatable coaxially, and a set of coupling units carried by the driving part and seared in recesses in the driving part so as to be in torque-transmitting engagement therewith, the coupling units being juxtaposed to an annular braking surface of the fixed part, each coupling unit being free to move, with respect to the driving and driven parts, into and out of engagement with the braking surface and including a wedging part having a wedging surface and a bearing part having a bearing surface, the arrangement being such that a driving torque, applied by the driving part to the coupling units, is transmitted by the latter to the driven part without engagement of the coupling units with the braking surface; but a reverse torque, applied by the driven part to the coupling units, first moves the bearing surface of each coupling unit into non-wedging engagement with the braking surface and then the wedging surface into wedging engagement with the braking surface, the wedging engagement being progressive due to the bearing surface so as to progressively lock up the rotary coupling.

2. A rotary coupling as claimed in claim 1, wherein each coupling unit includes a wedging element which defines the wedging part and a roller bearing which defines the bearing part, the major part of the wedging element being cylindrical with a cylinder axis parallel to the rotational axis of the rotary coupling, the cylinder being truncated parallel to its axis to define the said wedging surface of the coupling unit facing the adjacent braking surface of the fixed part.

3. A rotary coupling as claimed in claim 2, wherein each wedging element defines an axis parallel to the axis of the fixed part about which a moment can be taken, and each wedging element is engaged by the driving part for transmission of the driving torque by a generally tangential thrust applied in a radial zone closer to the moment axis than a radial zone in which the coupling unit engages the driven part.

4. A rotary coupling as claimed in claim 1, wherein the said bearing surface is proud of the wedging surface.

5. A rotary coupling as claimed in claim 1, wherein each recess includes a slot and each coupling unit includes a skirt which is received in the slot, the skirt acting to stabilise the coupling unit in a direction parallel to the rotational axis of the rotary coupling.

6. A rotary coupling as claimed in claim 5, wherein the skirt includes an opening and the slot includes a pin element which is received in the opening of the skirt, the pin element, on application of a reverse torque to the rotary coupling, aiding movement of the coupling unit into wedging engagement with the braking surface of the fixed part.

7. A rotary coupling as claimed in claim 1, wherein each coupling unit includes an opening and the driven part includes a pin element which is received in the said opening, the pin element, on application of a reverse torque to the rotary coupling, aiding movement of the coupling unit into wedging engagement with the braking surface of the fixed part.

8. A rotary coupling as claimed in claim 1, wherein each coupling unit includes a pivot element which projects from the wedging surface into contact with the braking surface of the fixed part, the wedging part, on application of a reverse torque to the rotary coupling, pivoting about the pivot element so hut the wedging surface progressively engage the braking surface.

9. A rotary coupling as claimed in claim 1, wherein the coupling units are free to move independently of each other.

10. A rotary coupling comprising a driving part and a driven part, for transmission of driving torque between them, a fixed part in which the driving and driven parts are each rotatable coaxially, and a set of coupling units carried by the driving part and seated in recesses in the driven part so as to be in torque-transmitting engagement therewith, each recess having a slot and each coupling unit being juxtaposed to an annular braking surface of the fixed part and having a skirt received in the slot to stabilise the coupling unit in a direction parallel to the rotational axis of the rotary coupling, each coupling unit being free to move, with respect to the driving and driven parts, into and out of engagement with the braking surface, and the arrangement being such that a driving torque, applied by the driving part to the coupling units, is transmitted by the latter to the driven part without engagement of the coupling units, progressive move the coupling units into wedging engagement with the braking surface so as to progressively lock up the rotary coupling.

11. A rotary coupling as claimed in claim 10, wherein the skirt is a close fit in side slot so that, when a reverse torque is applied to the rotary coupling, one or both, sides of the slot frictionally engage the skirt to aid movement of the coupling unit into wedging engagement with the braking surface of the fixed part.

12. A rotary coupling as claimed in claim 10, wherein the coupling units are free to move independently of each other.

13. A rotary coupling comprising a driving part and a driven part, for transmission of driving torque between them, a fixed part in which the driving and driven parts are each rotatable coaxially, and a set or coupling units carried by the driving part and seated in recesses in the driven part so as to be in torque-transmitting engagement therewith, the coupling units being juxtaposed to an annular braking surface of the each part, each coupling unit being free to move, with respect to the driving and driven parts, into and out of engagement with the braking surface and including a wedging part, having a wedging surface, and a pivot element which projects form the wedging surface into contact with the braking surface of the fixed part, being such that a driving torque, applied by the driving part to the coupling units, is transmitted by the latter to the driven part without engagement of the coupling units with the braking surface; but a reverse torque, applied by the driven part to the coupling units, progressively wedging part about its respective pivot element so that the coupling units progressive move into wedging engagement with the braking surface to progressively lock up the rotary coupling.

14. A rotary coupling as claimed in claim 13, wherein the pivot element is a ball bearing spring biased towards the braking surface.

15. A rotary coupling as claimed in claim 13, wherein the coupling units are free to move independently of each other.

16. A rotary coupling comprising a driving part and a driven part, for transmission of driving torque between them, a fixed part in which the driving and driven parts are each rotatable coaxially, and a set of coupling units carried by the driving part and seated in recesses in the driven part so as to be in torque-transmitting engagement therewith, the coupling units being juxtaposed to an annular braking surface of the fixed part and being free to move, with respect to the driving and driven parts, into and out of engagement with the braking surface, each coupling unit including an opening and the driven part including a corresponding pin element which is received in the said opening, the arrangement being such that a driving torque, applied by the driving part in the coupling units, is transmitting by the latter to the driven part without engagement of the coupling units with the braking surface; but a reverse torque, applied by the driven part to the coupling units, moves each coupling unit into wedging engagement with the braking surface, the wedging engagement being progressive due to the pin element aiding the movement of the coupling unit to progressively lock up the rotary coupling.

17. A rotary coupling as claimed in claim 16, wherein he coupling units are free to move independently of each other.

* * * * *